United States Patent
Bachmann et al.

(10) Patent No.: US 9,325,695 B2
(45) Date of Patent: Apr. 26, 2016

(54) TOKEN CACHING IN TRUST CHAIN PROCESSING

(75) Inventors: David Werner Bachmann, Leander, TX (US); Nicholas George Harlow, Santa Cruz, CA (US); Heather Maria Hinton, Austin, TX (US); Patrick Ryan Wardrop, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1880 days.

(21) Appl. No.: 12/327,899

(22) Filed: Dec. 4, 2008

(65) Prior Publication Data

US 2010/0146290 A1 Jun. 10, 2010

(51) Int. Cl.
*H04L 29/06* (2006.01)

(52) U.S. Cl.
CPC ........ *H04L 63/0815* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 6,898,711 B1 | 5/2005 | Bauman et al. | |
| 7,225,464 B2 * | 5/2007 | Satyavolu et al. | 726/10 |
| 2003/0033535 A1 | 2/2003 | Fisher et al. | |
| 2004/0162786 A1 | 8/2004 | Cross et al. | |
| 2005/0154887 A1 | 7/2005 | Birk et al. | |
| 2006/0015932 A1 | 1/2006 | Ballinger et al. | |
| 2006/0020813 A1 | 1/2006 | Birk et al. | |
| 2007/0169175 A1 * | 7/2007 | Hall et al. | 726/3 |

OTHER PUBLICATIONS

Knauth et al; "UPnP Compression for IP based Field Devices in Building Automation," Knauth, S.; Kaslin, D.: Kistler, R.; Klapproth, A., 2006 IEEE Conference on Emerging Technologies and Factory Automation, Sep. 2006, pp. 445-448.

* cited by examiner

*Primary Examiner* — Jeffrey D Popham
(74) *Attorney, Agent, or Firm* — Garg Law Firm, PLLC; Rakesh Garg; William J. Stock

(57) ABSTRACT

A method, system, and computer usable program product for token caching in a trust chain processing are provided in the illustrative embodiments. An information in a token associated with a first request is mapped. A determination is made whether a requester of the first request has provided a constraint in the first request, the constraint concerning the token, the constraint forming a client constraint. The client constraint is stored. The information and the mapped information is stored, forming stored information. The token is received in a second request. The stored information is reused if the client constraint allows reusing the stored information. A further determination may be made whether a target system receiving the mapped information has provided a server constraint, the second constraint concerning the mapped information, the second constraint forming a server constraint. The stored information may be reused if the server constraint allows reusing the stored information.

19 Claims, 7 Drawing Sheets

TOKEN CACHING IN TRUST CHAIN PROCESSING

BACKGROUND OF THE INVENTION

1. Field of the Invention

The present invention relates generally to an improved data processing system, and in particular, to a computer implemented method for performing access control in a data processing system. Still more particularly, the present invention relates to a computer implemented method, system, and computer usable program code for token caching in trust chain processing.

2. Description of the Related Art

Data processing systems and applications executing thereon interact with each other in a data processing environment. Often, such interactions have to pass some type of security system so that only authorized data processing systems and applications are permitted to interact with each other in the data processing environment.

A variety of security systems is available for use in data processing environments. Some security systems verify the identity of a data processing system, an application, or a user, such as by using digital signatures. Other security systems verify the identity as well as authorization of a data processing system, an application, or a user to engage in the interaction in question. For example, a security system may use a combination of digital signature, encryption keys, and access control parameters to perform this level of security enforcement.

Still other security systems employ a structured method of presenting and processing security related information. The structured presentation of security related information is called a security token. This information may be contained within a message. The message may be consistent with standard-based descriptions, such as those provided by web services specifications, for example, WS-Security and WS-Trust specifications. For example, WS-Security specification describes how to include a pre-defined part of a message, such as a security header dedicated to carrying security information, into the message. As another example, WS-Trust specification defines how to structure information within the security header defined by the WS-Security specification.

Processing of security information included within a message according to these standards based definitions requires several steps and may be completed through functionality provided by a trust server. A Trust Server is an application that processes this security information through a process known as trust chain processing.

One such structured method of presenting this security information is a security token format defined by the Security Assertion Markup Language (SAML). SAML is an extensible markup language (XML) based organization of authentication and authorization information exchanged between, and within, security domains.

A security token in an organization of security information in a predefined format. The security information presented in a SAML-defined security token is called a SAML token. A SAML token is also known as a SAML assertion. The processing of the security information presented in this manner is called SAML token processing. Processing of security information represented by a SAML token often requires more than one step and may be completed by a trust server.

A security domain is a data processing environment, bound by a trust relationship, within which a given security token may be used. Information passed across security domains requires additional trust relationships to ensure that information valid in one domain can be trusted in another domain. A security domain may pass security tokens, such as SAML token, within a security domain or to another security domain when a data processing system, an application, or a user in the first security domain requests to access data, functionality, or services provided by the other security domain. Security domains include the security infrastructure capable of performing security token processing and assessing the authentication and authorization parameters of the requesting data processing system, application, or user.

SUMMARY OF THE INVENTION

The illustrative embodiments provide a method, system, and computer usable program product for token caching in a trust chain processing. An information in a token associated with a first request is mapped, forming mapped information. A determination is made whether a requester of the first request has provided a constraint in the first request, the constraint concerning the token, the constraint forming a client constraint. The client constraint is stored. The information and the mapped information is stored, forming stored information. The token is received in a second request. The stored information is reused if the client constraint allows reusing the stored information.

The client constraint may include a time of expiry of the token, a duration of validity of the token, a number of reuse permitted of the token, an indication whether a target system can receive the client constraint, or a combination thereof. A further determination may be made whether a target system receiving the mapped information has provided a second constraint, the second constraint concerning the mapped information, the second constraint forming a server constraint. The stored information may be reused if the server constraint allows reusing the stored information. The server constraint may include a time of expiry of the mapped information, a duration of validity of the mapped information, a number of reuse permitted of the mapped information, or a combination thereof. A conflict between the client constraint and the server constraint may be resolved with respect to the token and the mapped information resulting from the token.

The requester may control the reuse of the information in the token by a trust service. The token may be an incoming SAML token, the information may be authentication information, the mapping may be a part of a trust chain processing, and the mapped information may be an issued outgoing token.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments are described using SAML token processing only as an example for the clarity of the description. The illustrative embodiments may be similarly implemented where the security information may be in the form of a username and password pair, a system specific data construct, or a proprietary organization of data.

In many data processing environments, an application may repeatedly present tokens to another application. For example, a client application may present a SAML token with each request to an application. Furthermore, the client application may present the same SAML token with each request to the application.

Many applications, such as a customer information control system (CICS) application, have to use some or all of the security information that may be included in a SAML token or some substitute thereof. However, these applications may need this information to be presented in a format that differs from the format of the SAML token. For example, a CICS application may require a resource access control facility identifier (RACF ID) and a corresponding passticket instead of a SAML token.

However, illustrative embodiments recognize that few applications have the capability of understanding security information that may be organized in any of a number of ways of organizing security information. Parsing a SAML token may not be within the capabilities of many applications that have to use the security information typically presented in SAML Tokens.

In such environments, a trust service provides the trust chain processing. The trust service in performing the trust chain processing, inter alia, performs the validation of the token, parsing of the data presented by in the token, and issuance of the token information for use by the target application. The trust chain processing may also include mapping of the token information to other forms or formats according to the target application.

Presently, a security system capable of processing the type of organization of security information expected in a data processing environment is included as a layer on top of many applications. Such a security system forming such a layer in a data processing environment is also known as a trust server. Federated identity management system is an example of a trust server.

As an example, a trust server responsible for trust chain processing in a security domain may process a SAML token that a different security domain may present with a request to a particular application within the security domain of the trust server. The trust server then transforms the security information from the SAML token into a form that the particular application may know how to use, and passes the transformed security information to that application.

However, illustrative embodiments recognize that trust chain processing is a resource intensive process. In a data processing environment, one way of computing the cost of executing an application bases the cost on the amount of resources, such as CPU cycles and memory space, the application consumes. From this point of view, trust chain processing is an expensive process. Illustrative embodiments recognize that performing trust chain processing repeatedly may further increase the cost of trust chain processing.

Furthermore, a token processing mechanism may use a token cache, which is a data storage area, such as an area of memory associated with a data processing system. Token cache can grow in size as increasing number of tokens are received, processed, or both. A growing token cache may become a factor in degrading the performance of the overall data processing system and the applications executing thereon.

To address these and other problems related to processing security information, the illustrative embodiments provide a method, system, and computer usable program product for token caching. The token caching techniques of the illustrative embodiments may be usable in conjunction with trust chain processing.

The token caching techniques described with respect to the illustrative embodiments may be useful in keeping the size of the token cache smaller as compared to the size of token cache with presently available techniques. The illustrative embodiments may also be useful in improving the efficiency of searching a token cache by virtue of the small size of the token cache according to the illustrative embodiments.

The illustrative embodiments may also be used in conjunction with other types of caching techniques. For example, the illustrative embodiments may be used in conjunction with a cache mechanism that is configured to determine some parameters of the tokens on its own. As another example, the illustrative embodiments may be used with an application that may be configured to add tokens to a data storage and set caching parameters.

The illustrative embodiments may be used in conjunction with any application or any data processing system that may use security information, including but not limited to presently available trust servers. The illustrative embodiments are described using SAML token processing only as an example, and the described SAML tokens or processing thereof is not limiting on the illustrative embodiments. The illustrative embodiments may be used in conjunction with any organization of security information and in any type of trust chain processing. In some implementations, the illustrative embodiments may be used to process information related to a particular sender of a request, such as a username and password, or information related to a request, transaction, or processing in the manner described to gain access to controlled resources.

For example, the illustrative embodiments may be implemented with a digital certificate processing system. The illustrative embodiments may further be implemented in conjunction with any business application, enterprise software, and middleware applications or platforms. Additionally, the illustrative embodiments may be implemented in conjunction with a hardware component, such as in a firmware, as embedded software in a hardware device, or in any other suitable hardware or software form.

The illustrative embodiments provide a method, system, and computer usable program product for caching tokens and token related information in a token processing system. Caching information is saving the information such that the information may be reused without retrieving from the source of the information or without re-computing the information.

Caching of reusable information is known for information other than tokens and information resulting from tokens. Caching of tokens and token related information, however, is non-trivial extension of the caching principle, as will be apparent from this disclosure.

A token processing system may include pluggable modules that together implement a set of token processing steps used to complete a token processing task. Such a token processing system may be used where the token is a security token or any other token containing information that has to be processed using token processing.

A trust server including a token processing system may be used to process certain information contained in a message or required for processing a message. This information can be a part of the message or be a security token, such as a SAML token, that is bound to the message. For example, the information may be in a format of a token that the token processing system may validate, map, or issue for use in relation with the message.

When the information to be processed is represented as a security token, namely a token containing security specific or other authentication information, the trust server according to the illustrative embodiments may take the form of a security token service. When acting as a security token service, the processing of an illustrative embodiment may be invoked when a message with security information is received or when a message containing security information is to be generated.

When a message with security information is received, the illustrative embodiments extract the security information from the message, typically from a security header, and pass the security information to the trust server of the illustrative embodiments for processing. The trust server of the illustrative embodiments receive the security as a complex security information that may be encrypted and signed and may take many different formats. Complex security information is security information including multiple values.

The security information processed by the illustrative embodiments may have to be mapped, or converted, to a different form. In some cases, the security information may already be in a converted form at processing, and the illustrative embodiments may re-map the security information. The mapped or to-be-mapped security information may be stored in either a memory or a data storage associated with a data processing system or both.

Any advantages listed herein are only exemplary and are not intended to be limiting on the illustrative embodiments. Additional advantages may be realized by specific illustrative embodiments. Furthermore, a particular illustrative embodiment may have some, all, or none of the advantages listed above.

Figure 1:
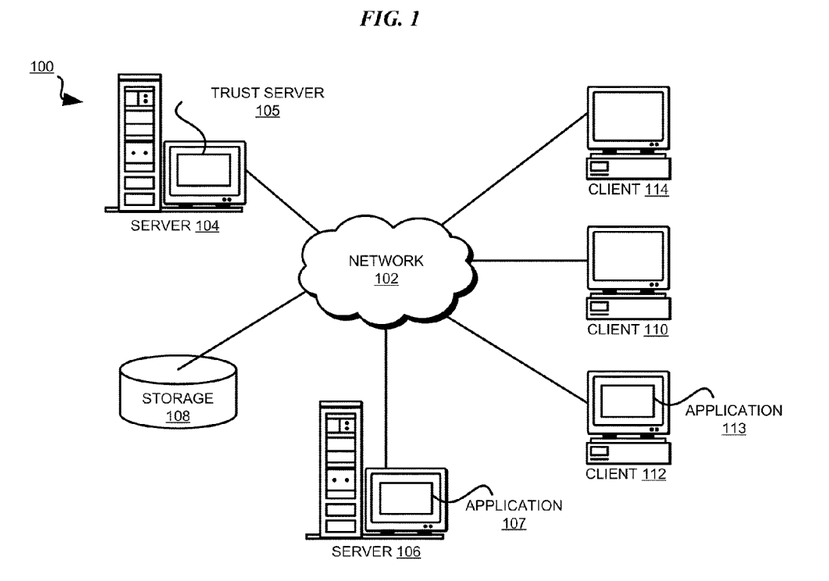
FIG. 1 depicts a pictorial representation of a network of data processing systems in which illustrative embodiments may be implemented.
Figure 2:
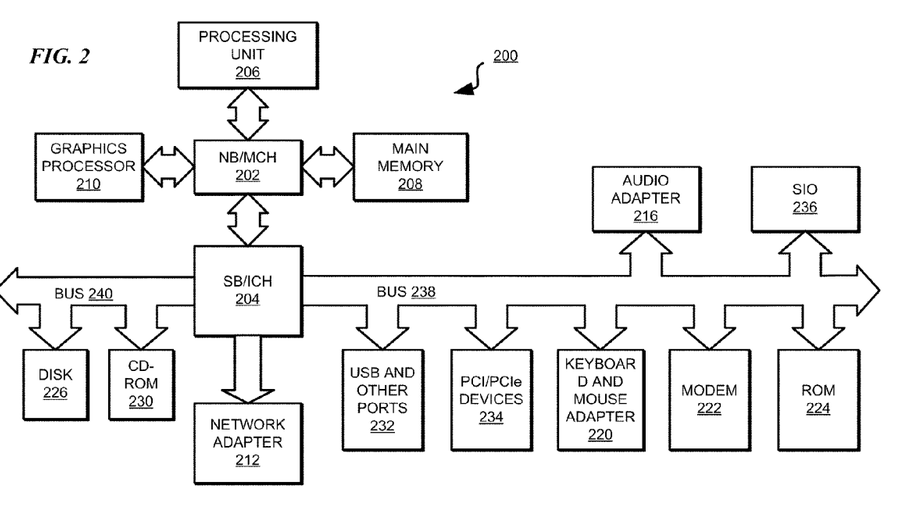
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes trust server 105, which may be an exemplary software application, in conjunction with which the illustrative embodiments may be implemented. Server 106 may include application 107, which may be a target system. Client 112 may be in a different security domain than the security domain of servers 104 and 106. Client 112 may include application 113, which may present a SAML token.

In addition, clients 110, 112, and 114 couple to network 102. Any of clients 110, 112, and 114 may have an application, typically a client application, executing thereon. As an example, client 112 is depicted to have application 113 executing thereon. Browser 113 may be a commonly used web-browser.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is the trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
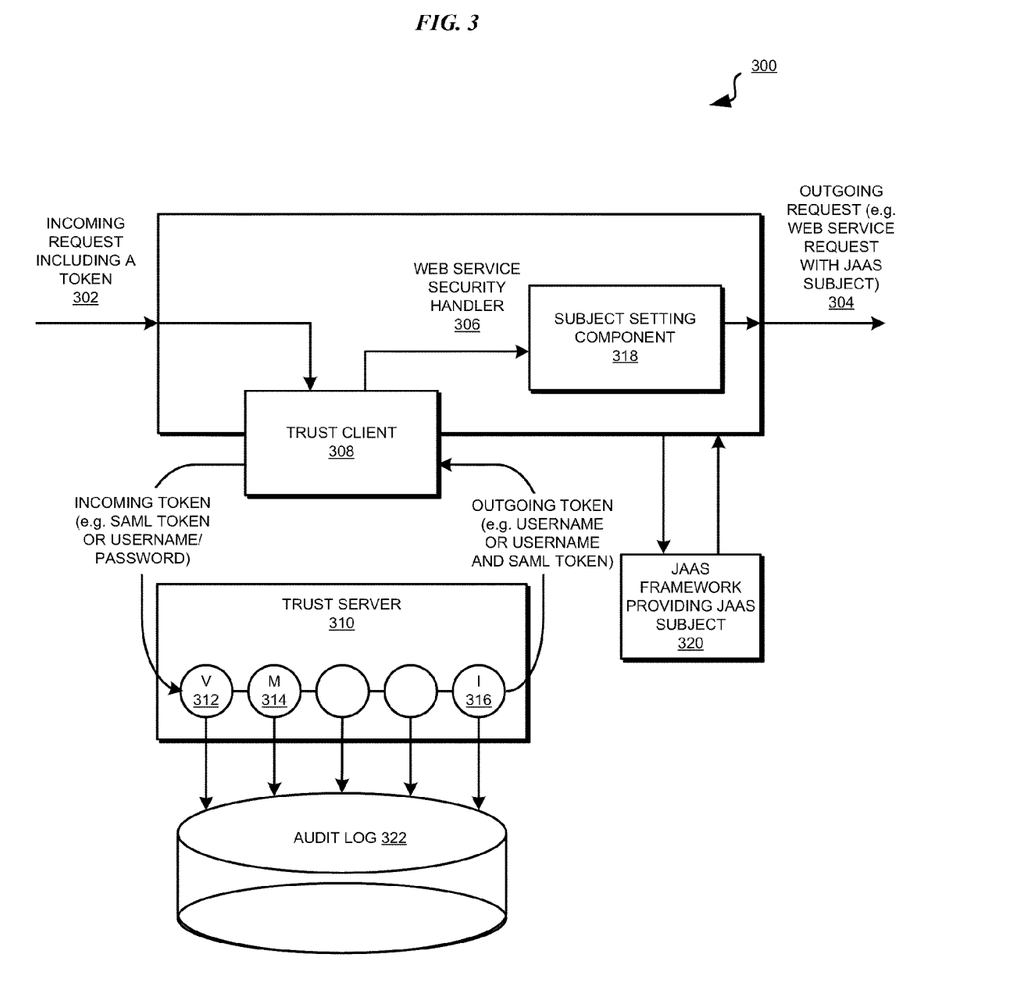
FIG. 3 depicts a block diagram of a trust chain processing system in which the illustrative embodiments may be implemented.

With reference to FIG. 3, this figure depicts a block diagram of a trust chain processing system in which the illustrative embodiments may be implemented. Trust chain processing system 300 may include trust server 105 in FIG. 1.

As an example, incoming request 302 may be a web service request with an incoming token, such as a SAML token or a username and password pair. Incoming request 302 may also be a web services security header, or any other type of request including tokenized information. Trust chain processing system 300 is depicted as processing a SAML token only as an example. Trust chain processing system 300 may be a trust chain processing system for processing any type of tokenized information, whether or not related to security.

Outgoing request 304 may be a web service request according to incoming request 302. However, outgoing request 304 may be modified such that outgoing request 304 is a web service request with the incoming token and/or modified security information, such as Java Authentication and Authorization Service (JAAS) subject.

To authorize access to resources, applications first need to authenticate the source of the request. The JAAS framework defines the term "subject" to represent the source of a request. A subject may be any entity, such as a person or a service. Once the subject is authenticated, a Java security object called "subject" is populated with identities associated with the request. The identities are called principals and a subject may have several principals. For example, a user associated with the request may have a name principal, e.g., "John Doe", and a social security number principal, e.g. 123-45-6789.

A subject may also include security information in the form of security related attributes called credentials or other general use attributes. For example, the subject may include other attributes that may not be security attributes. The subject may include such attributes for use by down-stream systems within a security domain so that those down-stream systems do not have to regenerate, calculate, or find those attributes.

The operation of trust chain processing system 300 is described using a SAML token as an example of the incoming token in incoming request 302. Web service security handler 306 may be a software component of trust chain processing system 300 that communicates with data processing systems, applications, and users. Some of these data processing systems, applications, and users may send requests with security information and some may be target systems.

Web service security handler 306 may route incoming request 302 to trust client 308. Trust client 308 may be a component that facilitates communication between web service security handler 306 and trust server 310. Trust server 310 is also known as a trust service. Trust client 308 may pass the security information associated with incoming request 302, such as a SAML token, to trust server 310.

Trust server 310 may include validating component 312 that may validate the security information. Trust server 310 may further include mapping component 314 that may map or manipulate the security information into a modified format suitable for a target system. Issuing component 316 may issue or publish the modified security information as an outgoing token so that other components may send the outgoing token to the target system.

Trust server 310 may further include other components, such as additional mapping components similar to mapping component 314. Another example of components in trust server 310 may be a logging component that may log the mapped information to audit logs. A particular sequence of validating component 312, particular mapping component 314, issuing component 316, and other components is called a trust chain.

At trust chain processing system 300, information about the message in which this security information was received is used to determine a configuration to load. This configuration identifies how to process the received security information, including the steps required by the trust chain processing system. Each of these steps may be implemented by an individual security information module according to configuration. This set of security information modules, when executed in series, provides a chain of processing that implements the overall processing for the received security information.

An outgoing token may include only the security information that a target system may be able to use. For example, the outgoing token may discard everything in the SAML token accompanying incoming request 302 and include only an identity associated with the original requester of incoming request 302. A particular implementation may include more, less, or different information in the outgoing token.

Trust server 310 returns the processed information to trust client 308 in the form of an outgoing token. Trust client 308 passes the outgoing token back to web service security handler 306. Web service security handler 306 may include subject setting component 318. Subject setting component 318 may use the outgoing token to set the subject object in outgoing request 304. Subject setting component 318 may set the subject in collaboration with JAAS framework 320 provided by a Java Virtual Machine. JAAS framework 320 may provide the JAAS subject that may accompany outgoing request 304. Web service security handler 306 may then send outgoing request 304 to a target system for responding.

While performing each of their respective functions, validating component 312, mapping component 314, issuing component 316, and any other component in the trust chain may write some or all of the information contained in the security token, such as a SAML token, to audit log 322. For example, validating component 312 may write the received SAML token to audit log 322. Mapping component may 314 may write the received SAML token and mapped information to audit log 322. Issuing component 316 may write the mapped and issued information to audit log 322.

Audit log 322 may be a flat file, an index file, a relational database, an object oriented database, or a data structure of any other type suitable for storing data. Each component emits a potentially different audit record to audit log 322.

Validation by validating component 312 and issue by issuing component 316 are always performed in token processing. Consequently, cost associated with this token processing is a minimum of the cost of processing the information through the trust service—trust server 310, and the trust chain—validating component 312, issuing component 316, and mapping component 314. Mapping component 314's cost is an additional processing cost.

Thus, if each incoming request 302 includes the same token as a previous incoming request 302, the same token is processed all over again. A data processing environment processing the same token repeatedly incurs these costs repeatedly. Illustrative embodiments provide a way in which such information can be processed and handled in a more efficient manner in comparison.

Figure 4:
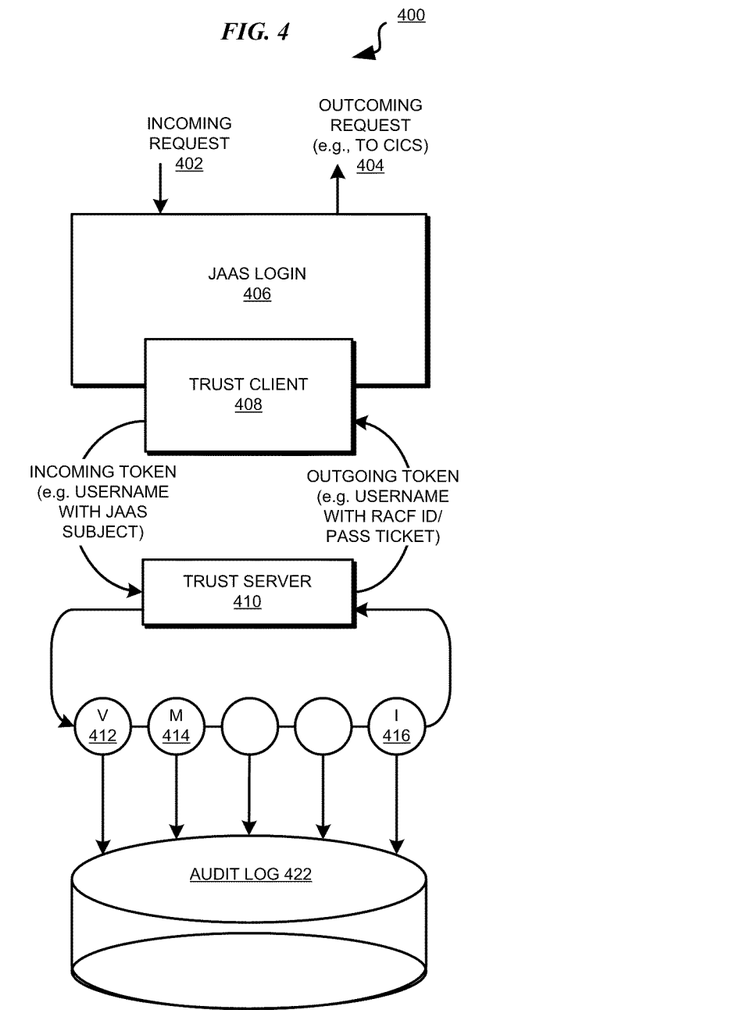
FIG. 4 depicts a block diagram of a trust chain processing system associated with a target application within which the illustrative embodiments may be implemented.

With reference to FIG. 4, this figure depicts a block diagram of a trust chain processing system associated with a target application within which the illustrative embodiments may be implemented. Trust chain processing system 400 may be implemented as trust chain processing system 300 in FIG. 3.

In one embodiment, incoming request 402 may be an original request from a client application. In another embodiment, incoming request 402 may be the outgoing request of a previous trust chain processing system, such as outgoing request 304 in FIG. 3.

JAAS login 406 may be part of a target system, such as a software application, that may be capable of using incoming request 402. In one embodiment, such as depicted in this figure, JAAS login 406 may be another trust chain processing system that may process a token associated with incoming request 402 differently for an end-user target system. For example, trust chain processing system 400 may process similar to token processing, username and password information associated with the JAAS subject that may be associated with incoming request 402. Any number of trust chain processing system 400 may intervene between trust chain processing system 300 and an end-user target system in a given data processing environment.

In this token processing, trust client 408 may operate in a manner similar to trust client 308 in FIG. 3. Trust server 410 may operate in a manner similar to trust server 310 in FIG. 3. Validating component 412 may operate in a manner similar to validating component 312 in FIG. 3, but may perform a different validation owing to the different nature of the token being processed.

Similarly, mapping component 414 may operate in a manner similar to mapping component 314 in FIG. 3, but may perform a different mapping. Issuing component 416 may operate in a manner similar to issuing component 316 in FIG. 3 but may issue a different output. Other components in the trust chain of trust server 410 may operate in a manner similar to other components of trust server 310 in FIG. 3. Audit log 422 may operate in a manner similar to audit log 322 in FIG. 3, albeit may record different log entries owing to the nature of the token being different from the token processed in FIG. 3.

In the example depicted in this figure, incoming token includes a username and password with a JAAS subject. Through the token process of trust service of trust server 410, trust server 410 may return a different outgoing token suitable for an end-user target application. In the example depicted in this figure, the end-user target system may be a CICS application that may accept a username with a RACF ID and a corresponding passticket.

Thus, to provide such a token to the end-user target application, trust server 410 may provide an outgoing token that includes a username, RACF ID, and a passticket, to trust client 408. The username, the RACF ID, and the passticket included in the outgoing token may be derived from the information contained in the incoming token that included a username, password, and a JAAS subject.

Illustrative embodiments recognize that in processing a token in this manner, trust chain processing system 400 incurs costs similar to the cost of processing as described with respect to trust chain processing system 300 in FIG. 3. Trust chain processing system 400 may also repeat this processing each time the same incoming token is presented. Thus, trust chain processing system 400 may incur repeated costs for re-processing the same token, the same way.

Figure 5:
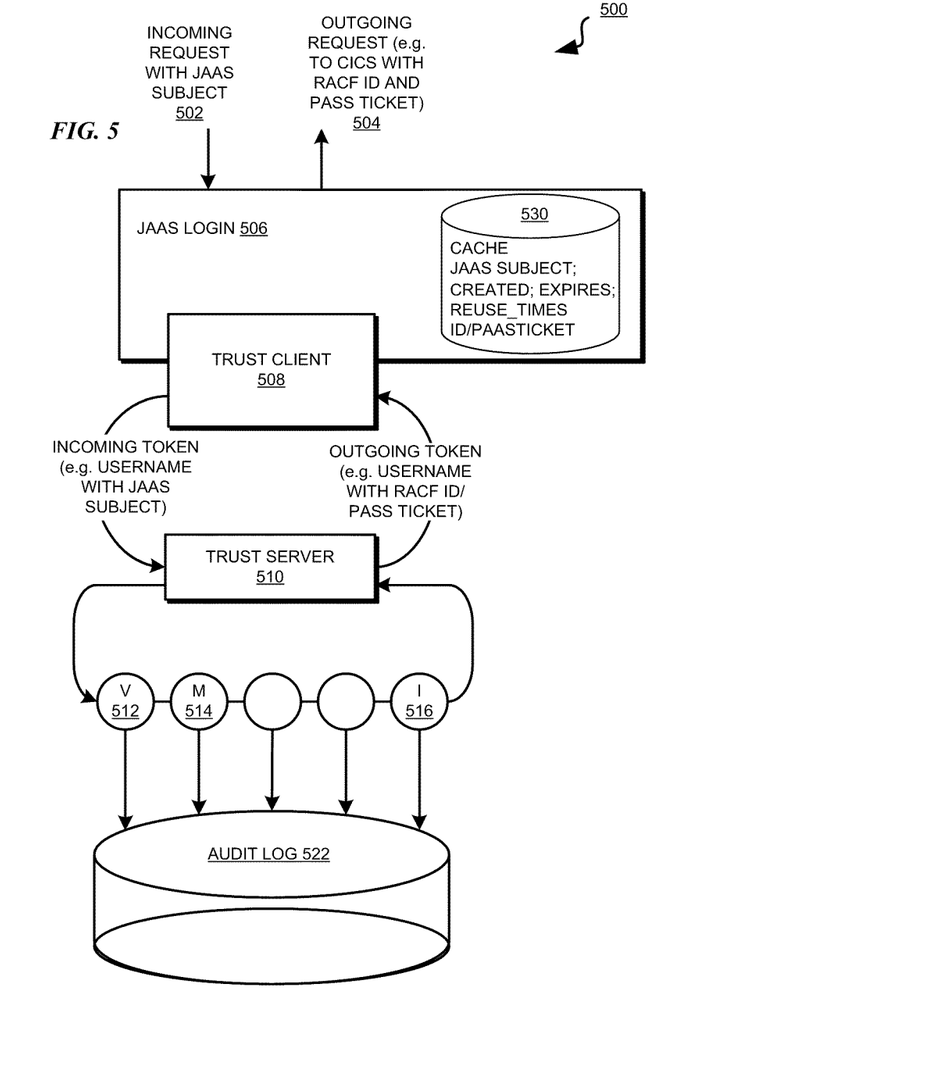
FIG. 5 depicts a block diagram of a token caching trust chain processing system associated with a target application in accordance with an illustrative embodiment.

With reference to FIG. 5, this figure depicts a block diagram of a token caching trust chain processing system associated with a target application in accordance with an illustrative embodiment. Trust chain processing system 500 may be implemented as trust chain processing system 400 in FIG. 4.

In one embodiment, incoming request 502 may be an original request from a client application. In another embodiment, incoming request 502 may be the outgoing request of a previous trust chain processing system, such as outgoing request 304 in FIG. 3.

JAAS login 506 may be analogous to JAAS login 406 in FIG. 4. Trust client 508 may operate in a manner similar to trust client 408 in FIG. 4. Trust server 510 may operate in a manner similar to trust server 410 in FIG. 4. Validating component 512 may operate in a manner similar to validating component 412 in FIG. 4. Mapping component 514 may operate in a manner similar to mapping component 414 in FIG. 4. Issuing component 516 may operate in a manner similar to issuing component 416 in FIG. 4. Other components in the trust chain of trust server 510 may operate in a manner similar to other components of trust server 410 in FIG. 4. Audit log 522 may operate in a manner similar to audit log 422 in FIG. 4.

In the example depicted in this figure, incoming token includes a username and password with a JAAS subject. Through the token process of trust server 510, trust server 510 may provide an outgoing token that includes a username, RACF ID, and a passticket, to trust client 508. The username, the RACF ID, and the passticket included in the outgoing token may be derived from the information contained in the incoming token that included a username, password, and a JAAS subject.

In accordance with an illustrative embodiment, cache 530 may store certain information pertaining to the incoming token and the outgoing token. Cache 530 may store this information so that the process through trust server 510 and trust server 510's trust chain may be avoided for repeat occurrences of the same incoming token. Cache 530 may be a storage unit for storing data. Cache 530 as a storage unit may be implemented using memory 208 in FIG. 2, a cache found in North Bridge and memory controller hub 202, a persistent data storage unit, such as a hard disk or flash memory, or any suitable medium for data storage.

A requester, such as a client application sending incoming request 502, may specify certain constraints on using the token information provided in incoming request 502. For example, the requester client may specify whether the client's security information associated with incoming request 502 may be stored at all. As another example, the requester client may specify a period for which the client's authentication information in the incoming token may be stored and reused. In some instances, the client may provide a start time and an expiry time during which the incoming token may be valid. In other instances, the client may provide a length of time from initial receipt that the incoming token may remain valid.

A requester may indicate other constraints with respect to the use of the incoming token associated with incoming request 502. For example, the requester client may specify how many times the incoming token information may be reused without re-processing or re-receiving from the client. Other variations of a requestor's constraints will be conceivable from this disclosure and the same are contemplated within the scope of the illustrative embodiments.

Cache 530 may store pieces of information, attributes, data fragments, or artifacts of the incoming token and the outgoing token. Cache 530 may store this information relative to incoming request 502, together with any constraints provided in the request that may govern the storage, re-use, and purging of the cached token information. In the example depicted in this figure, cache 530 is depicted as caching the JAAS subject, times of creation and expiry of the JAAS subject if any, a number of times the cached JAAS subject may be reused if any. Cache 530 is depicted as additionally storing the RACF ID and the passticket from the outgoing token corresponding to the JAAS subject information in the incoming token.

Figure 6:
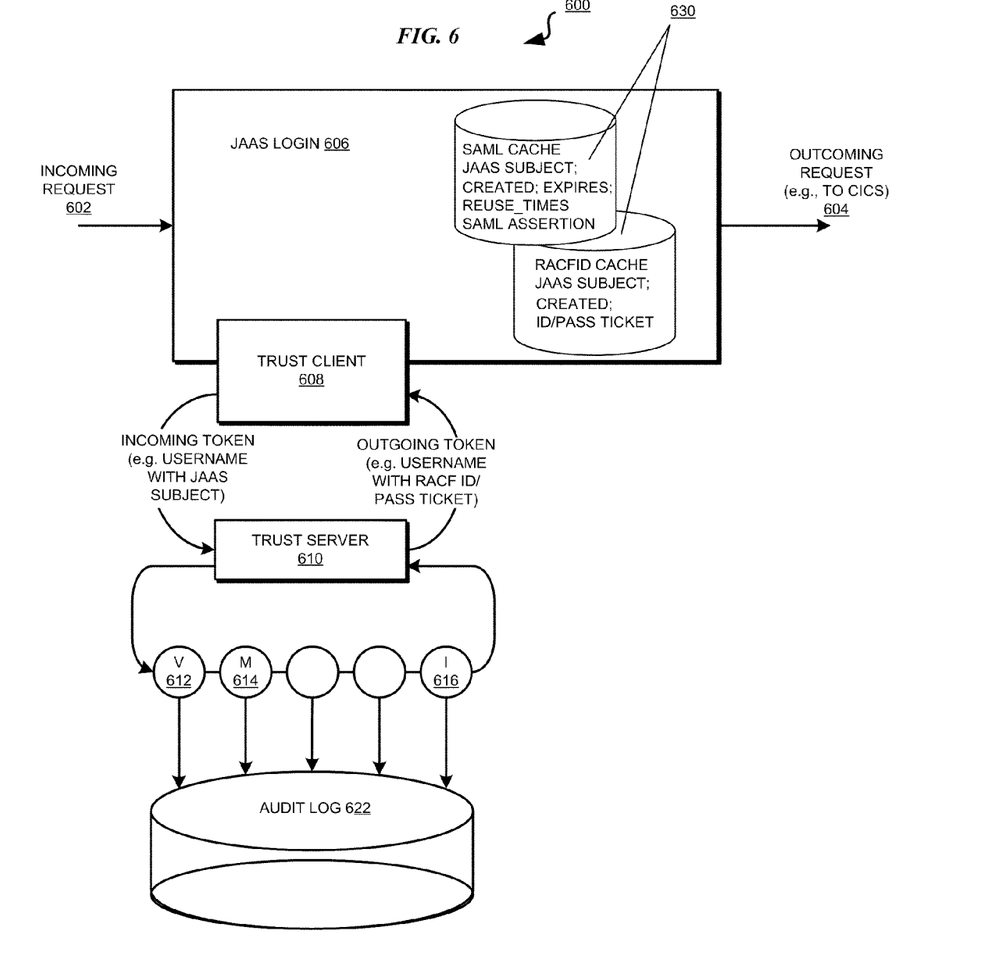
FIG. 6 depicts a block diagram of a token caching trust chain processing system in accordance with an illustrative embodiment.

With reference to FIG. 6, this figure depicts a block diagram of a token caching trust chain processing system in accordance with an illustrative embodiment. Trust chain processing system 600 may be implemented as trust chain processing system 500 in FIG. 5.

In one embodiment, incoming request 602 may be an original request from a client application. In another embodiment, incoming request 602 may be the outgoing request of a previous trust chain processing system, such as outgoing request 304 in FIG. 3.

JAAS login 606 may be analogous to JAAS login 506 in FIG. 5. Trust client 608 may operate in a manner similar to trust client 508 in FIG. 5. Trust server 610 may operate in a manner similar to trust server 510 in FIG. 5. Validating component 612 may operate in a manner similar to validating component 512 in FIG. 5. Mapping component 614 may operate in a manner similar to mapping component 514 in FIG. 5. Issuing component 616 may operate in a manner similar to issuing component 516 in FIG. 5. Other components in the trust chain of trust server 610 may operate in a manner similar to other components of trust server 510 in FIG. 5. Audit log 622 may operate in a manner similar to audit log 522 in FIG. 5.

In the example depicted in this figure, incoming token includes a username and password with a JAAS subject. Through the token process of trust service of trust server 610, trust server 610 may provide an outgoing token that includes a username, RACF ID, and a passticket, to trust client 608. The username, the RACF ID, and the passticket included in the outgoing token may be derived from the information contained in the incoming token that included a username, password, and a JAAS subject.

In accordance with an illustrative embodiment, cache 630 may store information and requester provided constraints pertaining to the incoming token and the outgoing token, as described above. Cache 630 may store this information so that the process through trust server 610 and trust server 610's trust chain may be avoided for repeat occurrences of the same incoming token.

A target system, such as an end-user target application, receiving outgoing request 604, may specify certain constraints on caching the token information provided in outgoing request 604. For example, the target system may specify whether the mapped security information in the outgoing token associated with outgoing request 604 may be stored at all. As another example, the target system may specify a period for which the authentication information in the outgoing token may be stored and reused. In some instances, the target system may provide a start time and an expiry time during which the outgoing token may be valid.

In other instances, the target system may provide a length of time from initial processing that the outgoing token may remain valid. For example, consider a SAML token that may contain a username and password that can be presented to downstream systems, such as in an HTTP Basic Auth header. Assume that a cache according to the illustrative embodiments has cached the username and password information for a user Jane such that the cached information is valid for the duration of her session. Assume that as a CICS policy, a RACF ID and passticket may not remain valid for longer than ten minutes. Consequently, RACF ID and passticket associated with a second user John may remain for ten minutes. Thus, the cache information for Jane will be valid for a long time, but for John, a new Passticket will have to be generated by the trust chain for requests that go beyond the previous RACF ID and passticket's ten min life-time or validity period.

A target system may indicate other constraints with respect to the use of the outgoing token associated with the outgoing request. For example, the target system may specify a number of times the outgoing token information may be reused without re-processing the incoming token from the client.

Furthermore, one or more requesters, one or more target systems, an intermediary system, an administrator, a policy implementation, another source of constraints, or a combination thereof, may provide such constraints to cache 630. For example, an administrator may enforce an administration policy that stale authentication information older than two minutes may not be re-used without reprocessing. Similarly, a system-wide policy may dictate that incoming tokens from a certain client should always be processed and never cached. As another example, a CICS target system may require regeneration of RACF ID and passtickets at every tenth request received within five minutes from the same client in the same session.

Many other constraints and variations of constraints will be conceivable from this disclosure and the same are contemplated within the scope of the illustrative embodiments. For example, in one embodiment, trust server 610 may itself impose constraints similar to the client constraints or target system constraints. Accordingly, caching to token information, and reuse of the cached information may be subject to constraints imposed by a client, a target system, a trust server, a trust chain processing system, another relevant data processing system or application, a policy, or a combination thereof, within the scope of the illustrative embodiments.

Cache 630 may store pieces of information, attributes, data fragments, or artifacts of the incoming token and the outgoing token. Cache 630 may store this information relative to incoming request 602, outgoing request 604, or both. Furthermore, cache 630 may cache this information together with any constraints provided in the client's request, target system instructions, trust server configuration, or a combination thereof, that may govern the storage, re-use, and purging of the cached token information.

Additionally, cache 630 may include a method for resolving conflicting constraints. For example, a client may allow the client's authentication information from the incoming token to be stored for one day, but a CICS application may restrict caching of RACF ID to five minutes. In such an example scenario, cache 630 may use the lowest common denominator approach to resolve the conflicting constraints and re-process the client's incoming token again after five minutes. Any method of resolving conflicting instructions may be used in conjunction with cache 630 without departing from the scope of the illustrative embodiments.

In the example depicted in this figure, cache 630 is depicted as caching information pertaining to the incoming token, such as a SAML token or a derivative thereof, with corresponding requester constraints. In this example, cache 630 caches the JAAS subject, the SAML assertion, times of creation and expiry, if any, of the JAAS subject or SAML Token, and number of times the cached information may be reused, if any.

In the example depiction, cache 630 is further depicted as caching information pertaining to the outgoing token, with corresponding target system constraints. Cache 630 is depicted as storing the RACF ID and the passticket from the outgoing token corresponding to the JAAS subject information in the incoming token. Cache 630 is also depicted as storing a creation time of the RACF ID and passticket, such as for an implied constraint that if a stored RACF ID was created less than a predetermined period ago, the RACF ID may be reused.

An implementation of the illustrative embodiments may implement cache 630 as a single cache for information together with caching requester constraints and target system constraints. Another implementation of the illustrative embodiments may implement cache 630 as separate caches, one for caching information with requester constraints, and another for caching information with target system constraints. Such implementation variations are contemplated within the scope of the illustrative embodiments.

Figure 7:
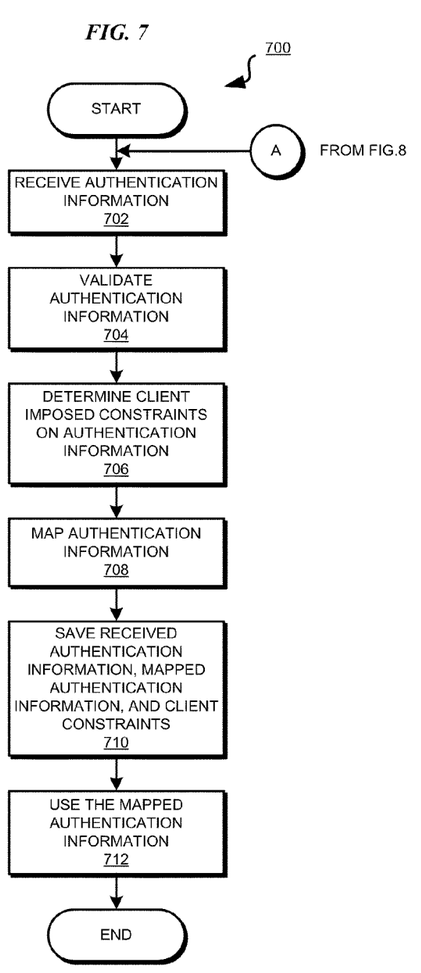
FIG. 7 depicts a flowchart of a process for token caching in trust chain processing in accordance with an illustrative embodiment.

With reference to FIG. 7, this figure depicts a flowchart of a process for token caching in trust chain processing in accordance with an illustrative embodiment. Process 700 may be implemented in trust chain processing system 500, such as for caching using cache 530 in FIG. 5.

Process 700 begins by receiving authentication information (step 702). Process 700 receives the authentication information of step 702 as a token associated with a request.

Process 700 may validate the authentication information (step 704). Process 700 determines if any client imposed constraints are associated with the information received in step 702, and identifies such client imposed constraints, if present (step 706).

Process 700 maps the authentication information, such as by using a mapping component in a trust chain in the manner described above (step 708). Process 700 saves the received authentication information, the mapped authentication information, client constraints, or a combination thereof (step 710). Process 700 uses the mapped authentication information, such by sending the mapped information to a target system (step 712). Process 700 ends thereafter.

Figure 8:
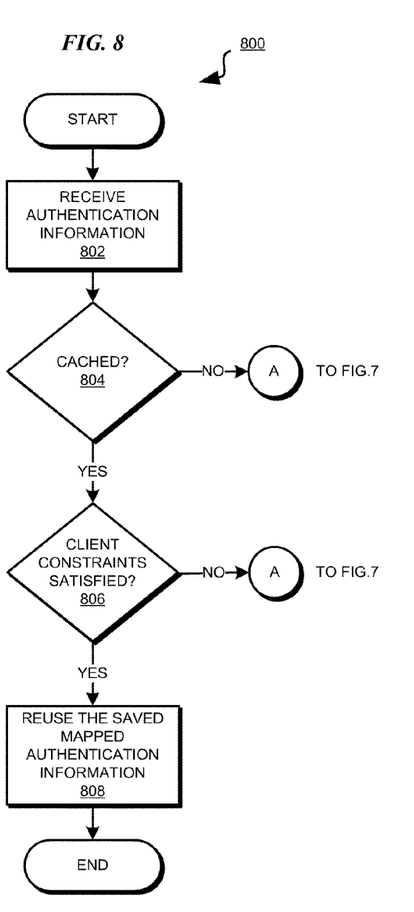
FIG. 8 depicts a flowchart of a process of using cached token information in accordance with an illustrative embodiment.

With reference to FIG. 8, this figure depicts a flowchart of a process of using cached token information in accordance with an illustrative embodiment. Process 800 may be implemented in trust chain processing system 500 in FIG. 5. For example, JAAS login 506 in FIG. 5 may use process 800 to reuse cached RACF ID and passticket with a CICS application for a request in a session with a particular requester client.

Process 800 begins by receiving authentication information (step 802). Authentication information received in step 802 may be a repeat of the authentication information received from a particular requester in relation with a particular session with a particular target system.

Process 800 determines if the authentication information received in step 802, and the result of processing that authentication information through a trust server is available in a cache (step 804). If process 800 determines that the authentication information and the result of processing that authentication information are not available in the cache ("No" path of step 804), process 800 may transfer control to process 700 starting at step 702 in process 700. Process 800 ends when process 700, after receiving control from process 800, ends.

If process 800 determines that the authentication information and the result of processing that authentication information are available in the cache ("Yes" path of step 804), process 800 determines if client constraints associated with such information in cache are satisfied (step 806). If process 800 determines that client constraints associated with such information in cache are not satisfied ("No" path of step 806), process 800 transfers control to process 700 starting at step 702 in process 700. Process 800 ends when process 700, after receiving control from process 800, ends.

If process 800 determines that client constraints associated with such information in cache are satisfied ("Yes" path of step 806), process 800 reuses the saved mapped authentication information (step 808). Process 800 ends thereafter. Process 800 may reuse the mapped authentication information, for example, by sending the mapped authentication information to the target system.

Figure 9:
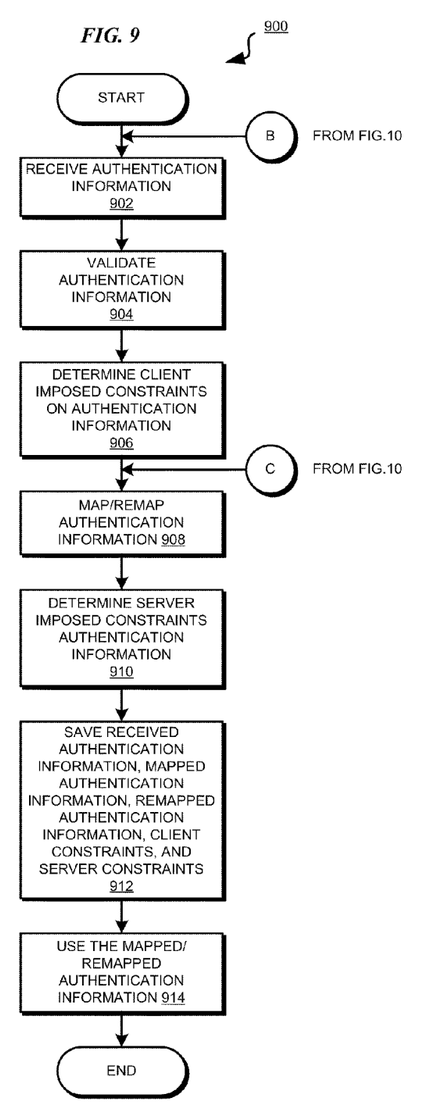
FIG. 9 depicts a flowchart of a process for token caching in trust chain processing in accordance with an illustrative embodiment.

With reference to FIG. 9, this figure depicts a flowchart of a process for token caching in trust chain processing in accordance with an illustrative embodiment. Process 900 may be implemented in trust chain processing system 600, such as for caching using cache 630 in FIG. 6.

Process 900 begins by receiving authentication information (step 902). Process 900 receives the authentication information of step 902 as a token associated with a request.

Process 900 may validate the authentication information (step 904). Process 900 determines if any client imposed constraints are associated with the information received in step 902, and identifies such client imposed constraints, if present (step 906).

Process 900 maps the authentication information, such as by using a mapping component in a trust chain in the manner described above (step 908). In some instances, the authentication information received in step 902 may already be mapped from an original incoming token. In such instances, process 900 may remap the already mapped authentication information in step 908.

Process 900 determines if any target system imposed constraints, in other words, server imposed constraints, are associated with the authentication information or mapped/re-mapped authentication information. Process 900 makes this determination and identifies such server imposed constraints, if present (step 910).

Process 900 saves the received authentication information, the mapped authentication information, remapped authentication information, client constraints, server constraints, or a combination thereof (step 912). Process 900 uses the mapped/re-mapped authentication information, such by sending the mapped/re-mapped information to a target system (step 914). Process 900 ends thereafter.

Figure 10:
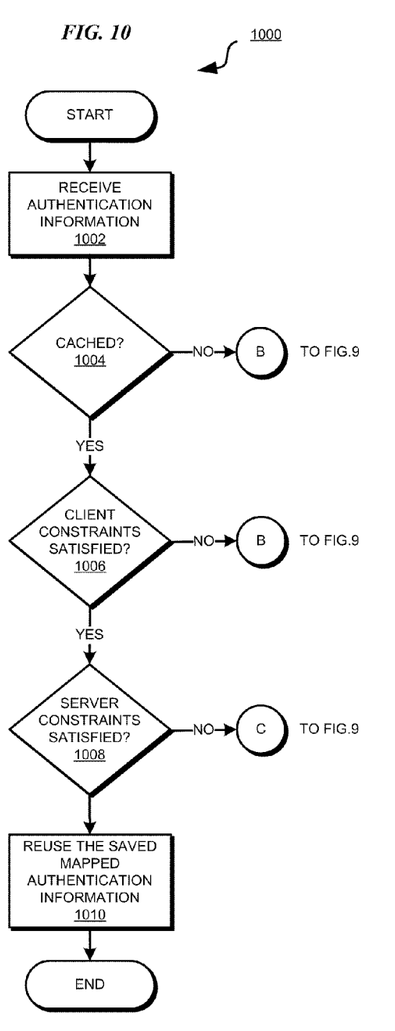
FIG. 10 depicts a flowchart of a process of using cached token information in accordance with an illustrative embodiment.

With reference to FIG. 10, this figure depicts a flowchart of a process of using cached token information in accordance with an illustrative embodiment. Process 1000 may be implemented in trust chain processing system 600 in FIG. 6. For example, JAAS login 606 in FIG. 6 may use process 1000 to reuse cached RACF ID and passticket with a CICS application for a request in a session with a particular requester client.

Process 1000 begins by receiving authentication information (step 1002). Authentication information received in step 1002 may be a repeat of the authentication information received from a particular requester in relation with a particular session with a particular target system.

Process 1000 determines if the authentication information received in step 1002, and the result of processing that authentication information through a trust server is available in a cache (step 1004). If process 1000 determines that the authentication information and the result of processing that authentication information are not available in the cache ("No" path of step 1004), process 1000 may transfer control to process 900 starting at step 902 in process 900. Process 1000 ends when process 900, after receiving control from process 1000, ends.

If process 1000 determines that the authentication information and the result of processing that authentication information are available in the cache ("Yes" path of step 1004), process 1000 determines if client constraints associated with such information in cache are satisfied (step 1006). If process 1000 determines that client constraints associated with such information in cache are not satisfied ("No" path of step 1006), process 1000 transfers control to process 900 starting at step 902 in process 900. Process 1000 ends when process 900, after receiving control from process 1000, ends.

If process 1000 determines that client constraints associated with such information in cache are satisfied ("Yes" path of step 1006), process 1000 determines if any server constraints associated with such information and the result of mapping such information in cache are satisfied (step 1008). If process 1000 determines that server constraints associated with such information in cache are not satisfied ("No" path of step 1008), process 1000 transfers control to process 900 starting at step 912 in process 900. Process 1000 ends when process 900, after receiving control from process 1000, ends.

If process 1000 determines that server constraints associated with such information in cache are satisfied ("Yes" path of step 1008), process 1000 reuses the saved mapped authentication information (step 1010). Process 1000 ends thereafter. Process 1000 may reuse the mapped authentication information, for example, by sending the mapped/re-mapped authentication information to the target system, to wit, the server.

Authentication information is used only as an example for clarity in describing processes 700, 800, 900, and 1000. An implementation may replace the authentication information with any other token related information. Any such token or token related information may be processed using any of processes 700, 800, 900, or 1000 without departing from the scope of the illustrative embodiments.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for token caching in trust chain processing. Any information communicated in the form of a token may be processed and cached according to the illustrative embodiments. Security information and authentication information, and tokens corresponding thereto are used in this disclosure only as examples. Such description and illustrations using security or authentication information are not limiting on the illustrative embodiments.

Security information, such as a SAML token, associated with an incoming request is processed through a trust chain by a trust service. Certain components of the security information are cached, and modified security information is issued to a target system.

Processing security information, such as SAML token, is resource intensive in a data processing environment. Security information may be reissued or reused from cache to any data processing system, application, or user in a data processing environment in the manner of the illustrative embodiments.

Illustrative embodiments reissue or reuse the cached information, cached mapped information, or cached remapped information in compliance with any constraints on their reissue or reuse. Client systems may impose constraints on reuse of the client's information during a session with a server system. Server system may also impose constraints on reissue or reuse of mapped information in a session. The trust server itself, or the trust chain processing system as a whole may also impose constraints on reissue or reuse of mapped information in a session. Illustrative embodiments resolve any conflicts that may exist among the applicable constrains using any conflict resolution method available for resolving conflicts among rules.

Illustrative embodiments contemplate several ways of managing the lifetime of the cached information in compliance with one or more constraints that may operate upon the cached information. For example, illustrative embodiments may be adapted to completely remove expired information from the cache. As another example, illustrative embodiments may also be adapted to flag any cached information that fails to qualify for reuse under a constraint.

In some cases, periodically or upon a condition, the illustrative embodiments may review the cached information for identifying expired information or information that may expire within a threshold period. The illustrative embodiments may mark, flag, or otherwise manipulate such identified information for managing the cache to a desirable size. Of course, illustrative embodiments may be adapted in other ways for managing cached information that may be suitable in particular implementations without departing from the scope of the illustrative embodiments.

Thus, illustrative embodiments avoid or reduce the cost of repeated processing of security information by reusing already processed information when possible. Caching and reusing token processing information involves non-trivial token processing steps that have to work in conjunction with caching process. For example, illustrative embodiments determine when to bypass token processing, which token processing steps to bypass, and which steps to re-perform, for using the cached information. Making such determinations, and altering token processing accordingly is distinct from using cached web content where no token processing occurs or is modified in the manner of the illustrative embodiments.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for token caching in a trust chain processing, the computer implemented method comprising:

mapping an information, which is present in a token received in a first request, forming mapped information, wherein the token comprises a system-specific data construct other than a username and password pair;

determining whether a requestor of the first request has provided a constraint in the first request, the constraint concerning the token, the constraint forming a client constraint;

storing the client constraint;

storing the information and the mapped information, forming stored information;

receiving the token in a second request;

determining whether a target system receiving the mapped information has provided a second constraint, the second constraint concerning the mapped information, the second constraint forming a server constraint; and reusing the stored information when the client constraint and the server constraint both allow reusing the stored information.

2. The computer implemented method of claim 1, wherein the client constraint includes one of (i) a time of expiry of the token, (ii) a duration of validity of the token, (iii) a number of reuse permitted of the token, and (iv) an indication whether a target system can receive the client constraint.

3. The computer implemented method of claim 1, wherein the server constraint includes one of (i) a time of expiry of the mapped information, (ii) a duration of validity of the mapped information, (iii) a number of reuse permitted of the mapped information.

4. The computer implemented method of claim 1, further comprising:

resolving a conflict between the client constraint and the server constraint with respect to the token and the mapped information resulting from the token.

5. The computer implemented method of claim 1, wherein the requestor controls the reuse of the information in the token by a trust service.

6. The computer implemented method of claim 1, wherein the token is an incoming SAML token, the information is authentication information, the mapping is a part of a trust chain processing, and the mapped information is an issued outgoing token.

7. A computer usable program product comprising a computer usable storage device including computer usable code for token caching in a trust chain processing, the computer usable code comprising:

computer usable code for mapping an information, which is present in a token received in a first request, forming mapped information;

computer usable code for determining whether a requestor of the first request has provided a constraint in the first request, the constraint concerning the token, the constraint forming a client constraint;

computer usable code for storing the client constraint;

computer usable code for storing the information and the mapped information, forming stored information;

computer usable code for receiving the token in a second request;

computer usable code for determining whether a target system receiving the mapped information has provided a second constraint, the second constraint concerning the mapped information, the second constraint forming a server constraint; and computer usable code for reusing the stored information when the client constraint and the server constraint both allow reusing the stored information.

8. The computer usable program product of claim 7, wherein the client constraint includes one of (i) a time of expiry of the token, (ii) a duration of validity of the token, (iii) a number of reuse permitted of the token, and (iv) an indication whether a target system can receive the client constraint.

9. The computer usable program product of claim 7, wherein the server constraint includes one of (i) a time of expiry of the mapped information, (ii) a duration of validity of the mapped information, (iii) a number of reuse permitted of the mapped information.

10. The computer usable program product of claim 7, wherein the requestor controls the reuse of the information in the token by a trust service.

11. The computer usable program product of claim 7, wherein the token is an incoming SAML token, the information is authentication information, the mapping is a part of a trust chain processing, and the mapped information is an issued outgoing token.

12. The computer program product of claim 7, wherein the computer usable code is stored in a computer readable storage medium in a data processing system, and wherein the computer usable code is transferred over a network from a remote data processing system.

13. The computer program product of claim 7, wherein the computer usable code is stored in a computer readable storage medium in a server data processing system, and wherein the computer usable code is downloaded over a network to a remote data processing system for use in a computer readable storage medium associated with the remote data processing system.

14. A data processing system for token caching in a trust chain processing, the data processing system comprising:

a storage device including a storage medium, wherein the storage device stores computer usable program code; and a processor, wherein the processor executes the computer usable program code, and wherein the computer usable program code comprises:

computer usable code for mapping an information, which is present in a token received in a first request, forming mapped information;

computer usable code for determining whether a requestor of the first request has provided a constraint in the first request, the constraint concerning the token, the constraint forming a client constraint;

computer usable code for storing the client constraint;

computer usable code for storing the information and the mapped information, forming stored information;

computer usable code for receiving the token in a second request;

computer usable code for determining whether a target system receiving the mapped information has provided a second constraint, the second constraint concerning the mapped information, the second constraint forming a server constraint; and computer usable code for reusing the stored information when the client constraint and the server constraint both allow reusing the stored information.

15. The data processing system of claim 14, wherein the client constraint includes one of (i) a time of expiry of the token, (ii) a duration of validity of the token, (iii) a number of reuse permitted of the token, and (iv) an indication whether a target system can receive the client constraint.

16. The data processing system of claim 14, further comprising:
   computer usable code for resolving a conflict between the client constraint and the server constraint with respect to the token and the mapped information resulting from the token.

17. The data processing system of claim 16, wherein the server constraint includes one of (i) a time of expiry of the mapped information, (ii) a duration of validity of the mapped information, (iii) a number of reuse permitted of the mapped information.

18. The data processing system of claim 14, wherein the requestor controls the reuse of the information in the token by a trust service.

19. The data processing system of claim 14, wherein the token is an incoming SAML token, the information is authentication information, the mapping is a part of a trust chain processing, and the mapped information is an issued outgoing token.

* * * * *